No. 729,053. Patented May 26, 1903.

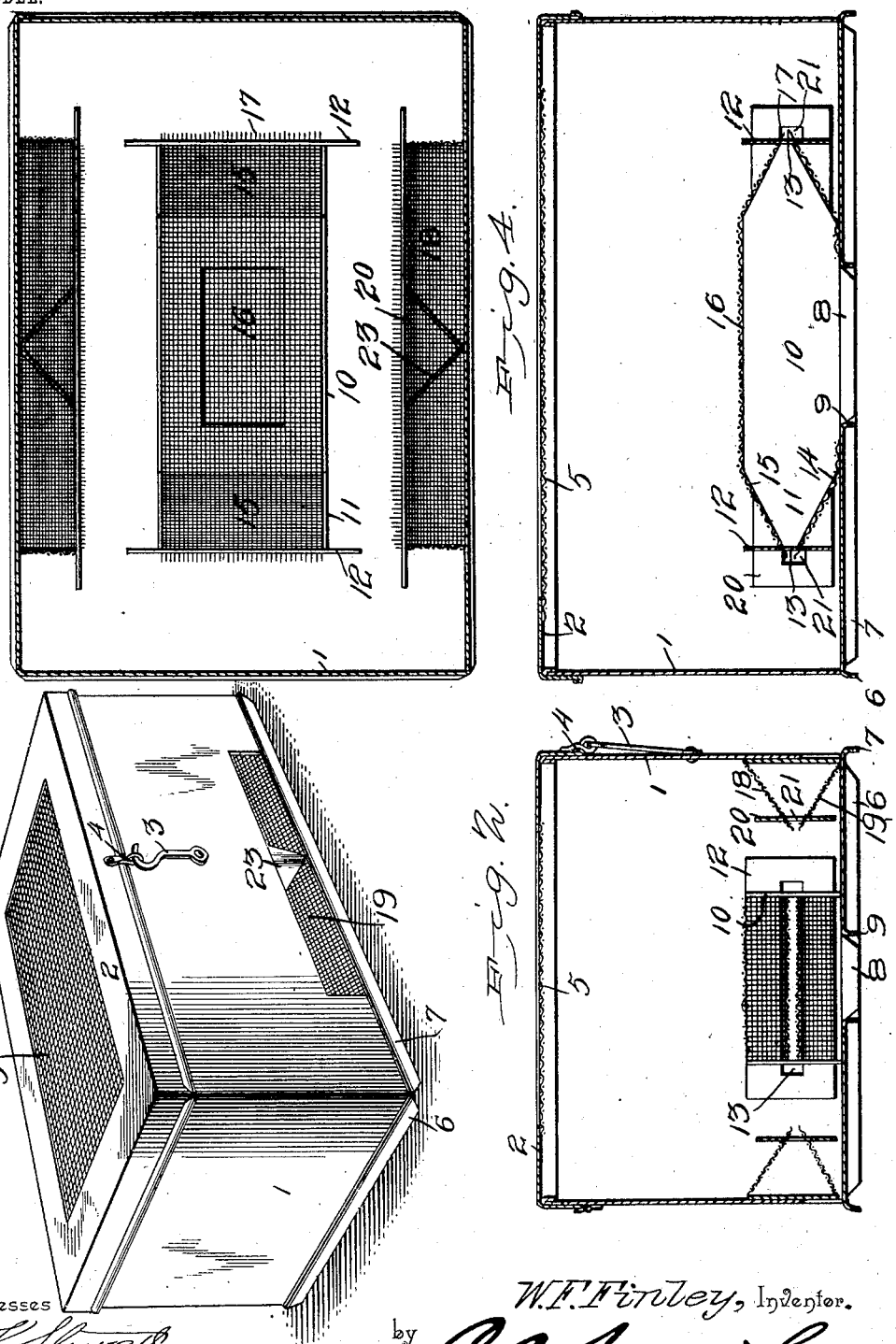

UNITED STATES PATENT OFFICE.

WILLIAM FREDERICK FINLEY, OF DENISON, TEXAS.

ANT-TRAP.

SPECIFICATION forming part of Letters Patent No. 729,053, dated May 26, 1903.

Application filed September 6, 1902. Serial No. 122,362. (No model.)

*To all whom it may concern:*

Be it known that I, WILLIAM FREDERICK FINLEY, a citizen of the United States, residing at Denison, in the county of Grayson and State of Texas, have invented a new and useful Ant-Trap, of which the following is a specification.

The invention relates to improvements in ant-traps.

The object of the present invention is to improve the construction of ant-traps and to provide a simple, inexpensive, and efficient one of great strength and durability adapted to be placed over an ant-hill and capable of capturing the ants in the hill as they leave the same and also of catching the outside ants as they attempt to enter the hill.

The invention consists in the construction and novel combination and arrangement of parts hereinafter fully described, illustrated in the accompanying drawings, and pointed out in the claims hereto appended.

In the drawings, Figure 1 is a perspective view of an ant-trap constructed in accordance with this invention. Fig. 2 is a transverse sectional view. Fig. 3 is a horizontal sectional view. Fig. 4 is a vertical longitudinal sectional view.

Like numerals of reference designate corresponding parts in all the figures of the drawings.

1 designates a casing, preferably in the form of a box, constructed of sheet metal or other suitable material and provided with a hinged lid or cover 2. The lid or cover, which is secured by a hook 3, an eye 4, or other suitable fastening device, is preferably provided with an opening covered by reticulated material 5, such as wire-gauze, to afford light for the interior of the trap. The body of the trap is provided with side and end flanges 6 and 7, and it has a central entrance-opening 8, from which depend side and end flanges 9, the said flanges being designed to be embedded in the earth around an ant-hill.

In practice the trap is placed over an ant-hill, the flanges 8 and 9 being embedded in the ground and the top of the hill being arranged within the central entrance-opening, so that ants leaving the ant-hill are compelled to enter the trap.

The ant-trap is provided at the central bottom opening with an entrance adapted to permit ants to readily enter the trap and capable of effectually preventing them from leaving it. This bottom entrance comprises two side walls 10, having tapered end portions 11, connected by end plates 12, arranged vertically and provided with central horizontal slots 13. The sides 10, which are preferably constructed of sheet metal, are also connected by inclined bottom portions 14 and oppositely-inclined top portions 15, the top and bottom portions being converged toward the end plates and being connected with the same at the top and bottom of the slots. The inclined top portions 15 are preferably formed integral with each other and are connected by an intermediate horizontal portion 16, and the said top and bottom portions are preferably constructed of wire-gauze or other suitable material adapted to afford a lighted entrance and at the same time capable of preventing ants from passing through the interstitial openings. The inclined bottom portions 14 extend upward from the ends of the bottom opening 8 to the lower edges of the slots 13, and the wire-gauze forms a series of projecting points 17 at the top and bottom of the slots, which will effectually prevent the ants from returning after they have passed through the said slots and left the same. The smooth vertical end plates also prevent the ants from crawling upward to the slots, as they are spaced from the bottom of the trap, and they depend from the upper edges of the bottom portions 14, so that the ants cannot crawl up the lower faces of the same.

The ant-trap is also provided with side entrances arranged at side apertures and composed of upper and lower oppositely-inclined portions 18 and 19, constructed of wire-gauze or other suitable material and connected at their inner edges to a vertically-disposed plate or guard 20, having a horizontal slot 21 and spaced from the bottom of the trap, similar to the end plates or guards 12. The ends of the side entrances are preferably formed by extensions of the top and bottom portions; but they may be constructed in any other suitable manner. The upper and lower portions 18 and 19 are also extended beyond the vertical plate or guard 20 to provide top and bottom points or projections for preventing the return of the ants. The side entrance is divided by a tapering approximately V-shaped piece 23, constructed of sheet metal or other suitable material and having inclined upper and lower edges which are secured to the wire-gauze top and bottom portions of the entrance. The sides of the V-shaped piece 23 diverge inwardly and reduce the size of the exposed portion of the slot 21.

The trap is designed more especially for catching large red ants, and after the ants of a hill have been captured they may be destroyed by the use of scalding water or any other suitable means.

What I claim is—

1. An ant-trap comprising a casing having an aperture at the bottom and provided with a bottom entrance composed of tapered side walls, inclined upper and lower portions spaced apart at their adjacent edges to provide a passage, and means located at the passage for preventing the return of the ants, substantially as described.

2. An ant-trap comprising a casing having an aperture at the bottom, and a bottom entrance composed of tapered side walls, inclined upper and lower portions spaced apart at their adjacent edges to provide a passage, and a guard provided at the said passage with a slot, and depending from the said passage and terminating short of the bottom of the trap, substantially as described.

3. An ant-trap comprising a casing having a bottom aperture, and a bottom entrance composed of tapered side walls, inclined upper and lower portions spaced apart to provide a passage, and a vertical plate or guard having a slot to receive the adjacent ends of the upper and lower portions, and extending above and below the same and terminating short of the bottom of the trap, substantially as described.

4. An ant-trap comprising a casing having a bottom aperture, and an entrance composed of oppositely-tapered side walls, upper and lower inclined portions spaced apart to provide a passage and having projecting points, and vertical plates having slots receiving the adjacent ends of the upper and lower inclined portions, substantially as described.

5. An ant-trap comprising a casing having an aperture, and an entrance composed of oppositely-inclined portions, means for connecting the same, and a vertical plate or guard having a slot receiving the adjacent edges of the upper and lower portions, substantially as described.

6. An ant-trap comprising a casing having a side opening, an entrance composed of upper and lower inclined portions, a guard arranged at the adjacent edges of the same and an approximately V-shaped piece having tapered side portions and arranged between the inclined upper and lower portions of the entrance, substantially as described.

In testimony that I claim the foregoing as my own I have hereto affixed my signature in the presence of two witnesses.

WILLIAM FREDERICK FINLEY.

Witnesses:
T. W. HEATH,
F. M. COUCHMAN.